(12) United States Patent
Regis et al.

(10) Patent No.: US 8,317,131 B2
(45) Date of Patent: Nov. 27, 2012

(54) BRAKING-ENERGY EQUALIZATION SYSTEM

(75) Inventors: Olivier Regis, Toulouse (FR); Kevin Scott, Frouzins (FR); Emmanuel Ray, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 785 days.

(21) Appl. No.: 12/168,958

(22) Filed: Jul. 8, 2008

(65) Prior Publication Data

US 2009/0065640 A1 Mar. 12, 2009

(30) Foreign Application Priority Data

Sep. 7, 2007 (FR) ...................................... 07 56360

(51) Int. Cl.
B64C 25/42 (2006.01)

(52) U.S. Cl. ..................... 244/111; 244/103 R

(58) Field of Classification Search .................. 244/111, 244/100 R, 103 R, 102 R, 102 A; 188/1.11 E, 188/1.11 L; 303/126
See application file for complete search history.

(56) References Cited

U.S. PATENT DOCUMENTS

| | | | | | |
|---|---|---|---|---|---|
| 3,948,569 | A | * | 4/1976 | Gentet et al. | 303/159 |
| 4,007,970 | A | * | 2/1977 | Romero | 303/126 |
| 4,043,607 | A | * | 8/1977 | Signorelli et al. | 303/112 |
| 4,140,352 | A | * | 2/1979 | Delpech et al. | 303/126 |
| 4,327,413 | A | * | 4/1982 | Ruof | 701/79 |
| 4,410,153 | A | * | 10/1983 | Romero | 244/111 |
| 4,685,748 | A | * | 8/1987 | Zoerb | 303/117.1 |
| 6,398,162 | B1 | * | 6/2002 | Stimson et al. | 244/111 |
| 6,478,252 | B1 | * | 11/2002 | Stimson et al. | 244/111 |
| 6,991,304 | B2 | * | 1/2006 | Villaume | 303/126 |
| 7,014,146 | B2 | * | 3/2006 | Villaume et al. | 244/111 |
| 7,865,289 | B2 | * | 1/2011 | Dellac et al. | 701/70 |
| 2005/0006524 | A1 | * | 1/2005 | Villaume et al. | 244/111 |
| 2005/0200198 | A1 | * | 9/2005 | Rudd, III | 303/167 |
| 2005/0231030 | A1 | * | 10/2005 | Frank | 303/126 |
| 2008/0201025 | A1 | * | 8/2008 | Dellac et al. | 701/3 |
| 2009/0210126 | A1 | * | 8/2009 | Dellac et al. | 701/70 |

FOREIGN PATENT DOCUMENTS

| | | |
|---|---|---|
| EP | 0498714 A | 8/1992 |
| EP | 1588912 A | 10/2005 |
| FR | 2898333 A | 9/2007 |
| GB | 664548 A | 1/1952 |

OTHER PUBLICATIONS

International Search Report dated Feb. 11, 2008.

* cited by examiner

Primary Examiner — Philip J Bonzell
(74) Attorney, Agent, or Firm — Perman & Green, LLP

(57) ABSTRACT

A braking-energy equalization system applied to an aircraft undercarriage, which undercarriage includes at least two sets of landing gear, with each set of landing gear including at least two wheels and with each of wheels being equipped with a brake, wherein the system includes means intended to introduce a delay time to delay the braking of the brakes having a higher braking torque in comparison with the other brakes having a lower braking torque, so as to equalize the braking energies absorbed by the brakes of the landing gear during the landing or during an interrupted takeoff of the aircraft.

8 Claims, 3 Drawing Sheets

BRAKING-ENERGY EQUALIZATION SYSTEM

BACKGROUND

1. Field

The disclosed embodiments relate to a system for equalizing the braking energies intended for the landing gear of an aircraft in order to distribute the braking energies among the landing gear, by introducing a braking delay between the brakes of the wheels that are subjected to the greatest vertical loads or that are rolling along a less contaminated runway and the brakes that are installed on the wheels that are subjected to smaller vertical loads or that are rolling along a more contaminated runway.

2. Brief Description of Related Developments

The disclosed embodiments are applicable to the field of aeronautics, and, more specifically, are intended for the landing gear of heavy aircraft.

As is known, a single aircraft may have different types of undercarriages: the main wing undercarriage, the main fuselage undercarriage, and the auxiliary undercarriage (the main forward undercarriage). The main fuselage undercarriage consists of one, two, or three sets of landing gear, and the wing undercarriage consists of two sets of landing gear, one mounted under each wing. The forward undercarriage is mounted at the front of the aircraft, near the nose. Each set of landing gear in the main undercarriages includes a set of twin bogeys containing 2, 4, or 6 wheels, the majority of which wheels are equipped with a brake. The forward undercarriage includes a steerable shock absorber equipped with twin wheels.

When an aircraft is in the deceleration phase, in addition to aerodynamic braking and engine braking (reverse thrusters), the main undercarriage participates in the absorption of the energy of the aircraft by means of its brakes. The undercarriage must withstand major loads due to the mass of the aircraft, which applies compressive vertical stress to the landing gear. During the landing of the aircraft or during an interrupted takeoff (each of which flight phases is associated with very high braking-energy levels), the wheels of a single given set of landing gear and the wheels of different sets of landing gear are not subjected to the same vertical loads.

This non-uniform distribution of the vertical loads among the sets of landing gear and among the wheels of a single set of landing gear leads to the application of different braking efforts and thus to different braking energies for each wheel, thereby entailing differential wear on the brakes. The brakes that absorb the largest amounts of energy (i.e., the ones that are more heavily stressed during the deceleration phases) wear out more quickly than the brakes that are less heavily stressed.

This suboptimal situation in terms of wear on the various brakes entails more frequent maintenance of the more heavily stressed landing gear, thus leading to higher overall maintenance costs.

SUMMARY

The disclosed embodiments enable better distribution of the braking energy supplied to the brakes of the landing gear, so as to reduce the problems associated with the non-homogeneous wear on the brakes. The disclosed embodiments also make it possible to optimize the absorption capacity of each brake. In particular, because the braking energies are distributed homogeneously to the wheels, wear is rendered comparable for all of the brakes that are installed. Consequently, the maintenance cycle is reduced, thus leading to a reduction in overall maintenance costs.

The principle of the disclosed embodiments are to time-shift the braking of the brakes that are installed on the wheels that are subjected to the greatest vertical loads or that are rolling along a less contaminated runway, during the landing of the aircraft or during an interrupted takeoff, and the brakes that are installed on the wheels that are subjected to smaller vertical loads or a more contaminated runway, so that the amounts of energy absorbed by each of the brakes are very similar.

In order to provide an effective and economical solution to the problem of different amounts of wear on the brakes of the wheels, the disclosed embodiments propose a braking-energy equalization system applied to an aircraft undercarriage, which undercarriage includes at least two sets of landing gear, with each set of landing gear including at least two wheels and with each of said wheels being equipped with a brake.

The system according to the disclosed embodiments includes means for equalizing the braking energies applied to the landing gear during the landing of the aircraft or during an interrupted takeoff.

The means for equalizing the braking energies applied to the landing gear include at least one delay mechanism for generating a delay in the application of the braking to the brake of a first wheel in relation to the application of the braking to the brake of a second wheel.

In one embodiment, the said at least one delay mechanism introduces a delay between the brakes of the different wheels of a single set of landing gear that includes at least two in-line wheels.

In another embodiment, the said at least one delay mechanism introduces a delay between the brakes of wheels of different sets of landing gear.

The duration of the said delay is preferably between 0.5 second and 1.5 seconds.

The system advantageously also includes a calculator that makes it possible to calculate automatically the said delay as a function of the mass and the center of gravity of the aircraft, and of the flight phase in question.

For an aircraft that includes at least two sets of landing gear, with each set of landing gear including at least two wheels, and with each of the wheels being equipped with a brake that is actuated by means of an actuator in order to control the opening or closing of a valve located between a hydraulic [fluid] distributor and a hydraulic brake line feeding the brake (which actuator is itself controlled remotely by brake controls located in the cockpit), the actuator for each brake is connected to the said brake controls by means of a delay mechanism that is part of the previously described braking-energy equalization system, which delay mechanism introduces an activation delay between the said actuators.

Generally speaking, the said actuator for each brake is an electrically controlled actuator that controls the opening or closing of the said valve located between the said brake line and the said hydraulic [fluid] distributor.

The disclosed embodiments will be better understood through a reading of the following description and through reference to the accompanying figures, which are provided solely for illustrative purposes and which in no way limit the disclosed embodiments.

The disclosed embodiments relate to a braking-energy equalization system for landing gear, which system allows the same braking energy to be absorbed by all of the brakes during the landing of an aircraft or during an interrupted takeoff. Thus, the goal of the system is to equalize the braking energy absorbed by the brakes that are capable of developing a higher average instantaneous torque, in comparison with the other brakes that are capable of developing a lower average instantaneous torque during the aircraft's deceleration.

DETAILED DESCRIPTION OF THE DRAWINGS

Figure 1:
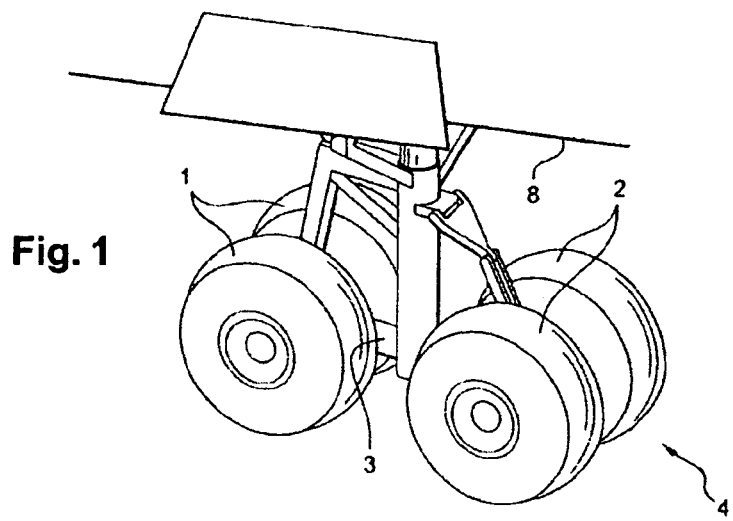
FIG. 1 is a schematic profile view of an aircraft undercarriage in the extended position during a landing, which undercarriage includes four wheels (two front wheels and two rear wheels)

FIG. 1 is a schematic profile view of an aircraft fuselage undercarriage [4] extended from its housing located in the fuselage [8] of the aircraft during a landing. In this position the undercarriage's bogey [3] includes four wheels (two front wheels [2] and two rear wheels [1]).

In a first embodiment, the delay in the application of the braking is introduced between the brakes of the different wheels of a single given set of landing gear that includes at least two in-line wheels.

In the example shown in FIG. 1, the deferred application of the braking time consists of introducing a delay [Δt] between the braking of the two rear wheels [[1]] (or, respectively, the front wheels [2]) of the bogey [3], whose brakes are capable of generating less torque, and the braking of the two front wheels [2] (or, respectively, the rear wheels [1]) of the bogey [3].

This delay [Δt] corresponds to the amount of time required to absorb the energy differential that the wheels cannot absorb during the phase in which all of the braked wheels of the aircraft are absorbing energy. Consequently, the amount of energy absorbed by the brake of the rear wheels (or, respectively, the front wheels) or of the front wheels (or, respectively, the rear wheels) is reduced, and the amount of energy that is absorbed becomes more similar to the energy absorbed by the brake of the front wheels (or, respectively, the rear wheels), which are capable of generating less torque.

Thus, this delay in the braking of the wheels that are more efficient (in terms of the torque that is developed, and thus in terms of the amount of energy absorbed) is equivalent to causing a shift in the amount of energy absorbed over time by these brakes, and therefore is equivalent to reducing the amount of energy that is absorbed.

Figure 2:
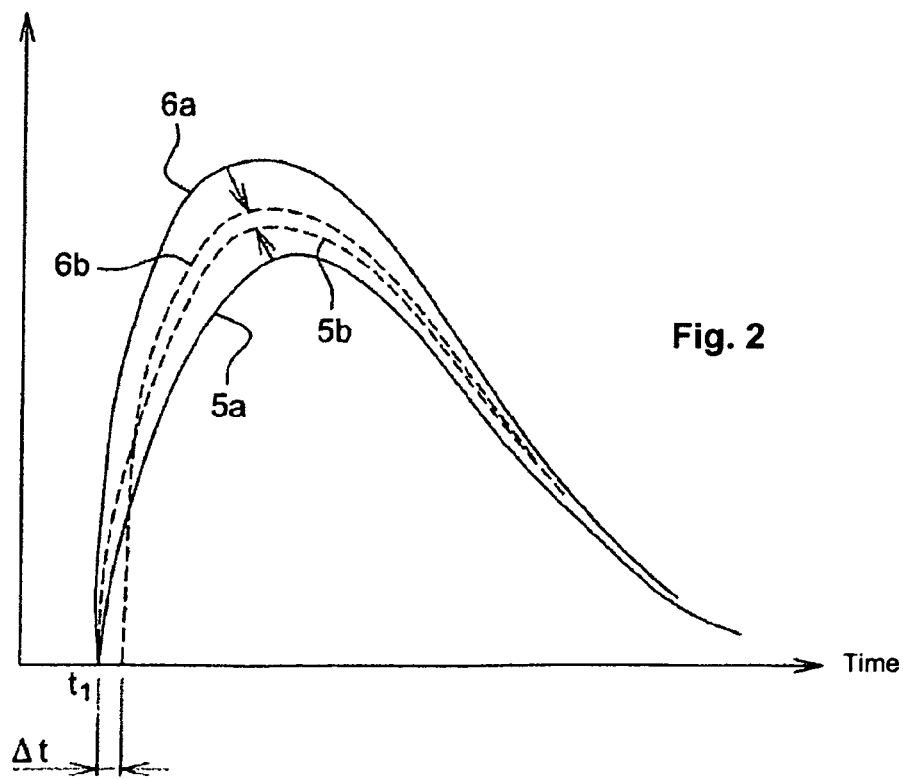
FIG. 2 is a schematic representation of four curves illustrating the amounts of energy absorbed by the wheels in FIG. 1 during the landing of the aircraft as a function of time, with the curves consisting of solid lines representing schematically the braking-energy curve for the brake on the rear wheels and the braking-energy absorption curve for the front wheels without deferred braking, and with the curves consisting of dashed lines representing the braking-energy curve for the brake on the same wheels after the application of a braking delay [Δt] between the front wheels and the rear wheels.

FIG. 2 illustrates an example of the amounts of energy absorbed by the wheels of the undercarriage [4] when the rear wheels [1] develop a higher average instantaneous torque than the front wheels [2]. The curves [6a and 5a] consisting of solid lines represent, respectively, the amount of braking energy absorbed by the rear wheels and by the front wheels if the braking between the front and rear wheels is not deferred, while the curves [6b and 5b] consisting of dashed lines represent the amount of braking energy absorbed by the brakes of the rear and front wheels after the application of a braking delay [Δt] between the front wheels and the rear wheels. FIG. 2 shows how the two curves showing the amounts of energy absorbed by the brake of the rear wheels [1] and the amounts of energy absorbed by the [brake of the] front wheels [2] become more similar after the delay has been applied.

When the delay is applied selectively in accordance with the wheels for the landing gear as a whole, the amounts of energy absorbed and the amounts of wear on the brakes as a whole are essentially identical, such that the lifetime of the brakes and the maintenance cycle are both optimized accordingly.

In a second embodiment, the delay in the application of the braking is introduced between the brakes of the wheels of different sets of landing gear.

Figure 4:
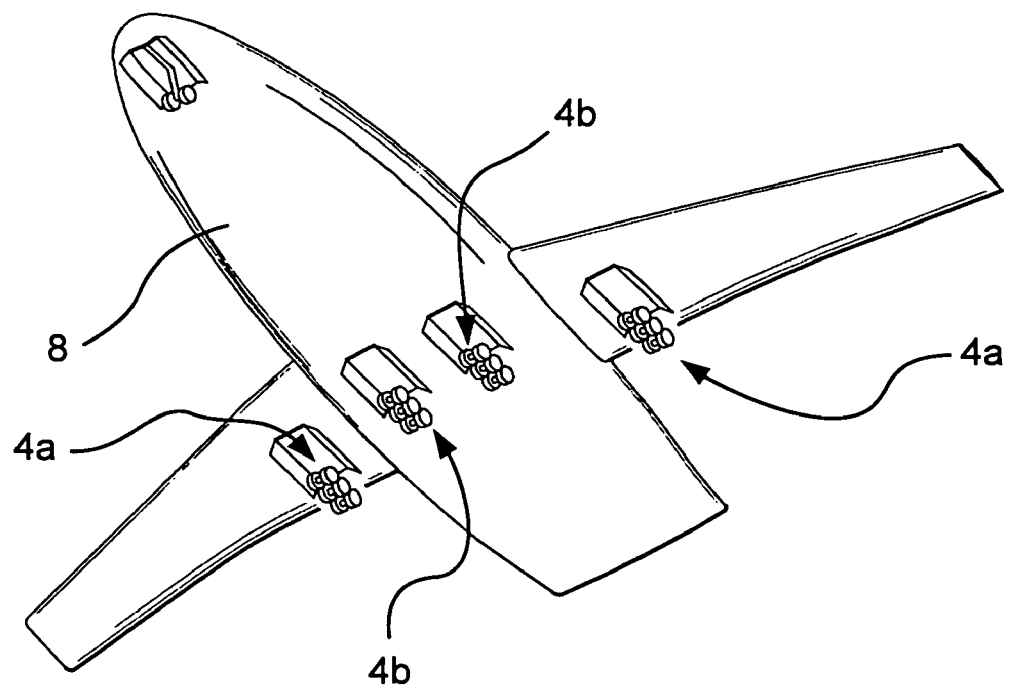
FIG. 4 is a simplified perspective view of the underside of a large airplane having two main wing landing gears and two main fuselage landing gears.

This time-deferred application consists of the introduction of a delay [.Δ.t] in the application of the braking of a first set of landing gear in relation to a second set of landing gear whose brakes have a greater energy-absorption capability. For example, in this case the same delay is introduced for all of the brakes of a single set of landing gear. In the case illustrated in FIG. 4 of a second exemplary embodiment, the braking on the fuselage landing gear 4b can be deferred in relation to the wing landing gear 4a and vice versa, depending on their respective capacities. It should be noted that different delays are also possible, depending on the mass and center of gravity of the aircraft and on the flight phase in question.

To anticipate the time-deferred braking in terms of the landing gear or in terms of the wheel, the equalization system includes a calculator [21] that makes it possible to calculate automatically the delay required in order to equalize the braking energies between the brakes of a single given set of landing gear, or between different sets of landing gear, as a function of the load that these brakes must withstand during landing, and as a function of the mass and the center of gravity of the aircraft, as well as of the flight phase in question. The duration of this delay is preferably between 0.5 second and 1.5 seconds. The gain in energy absorbed by the brakes has been estimated at between 5% and 15% of the maximum energy required for braking when the brake-delay system is applied.

Figure 3:
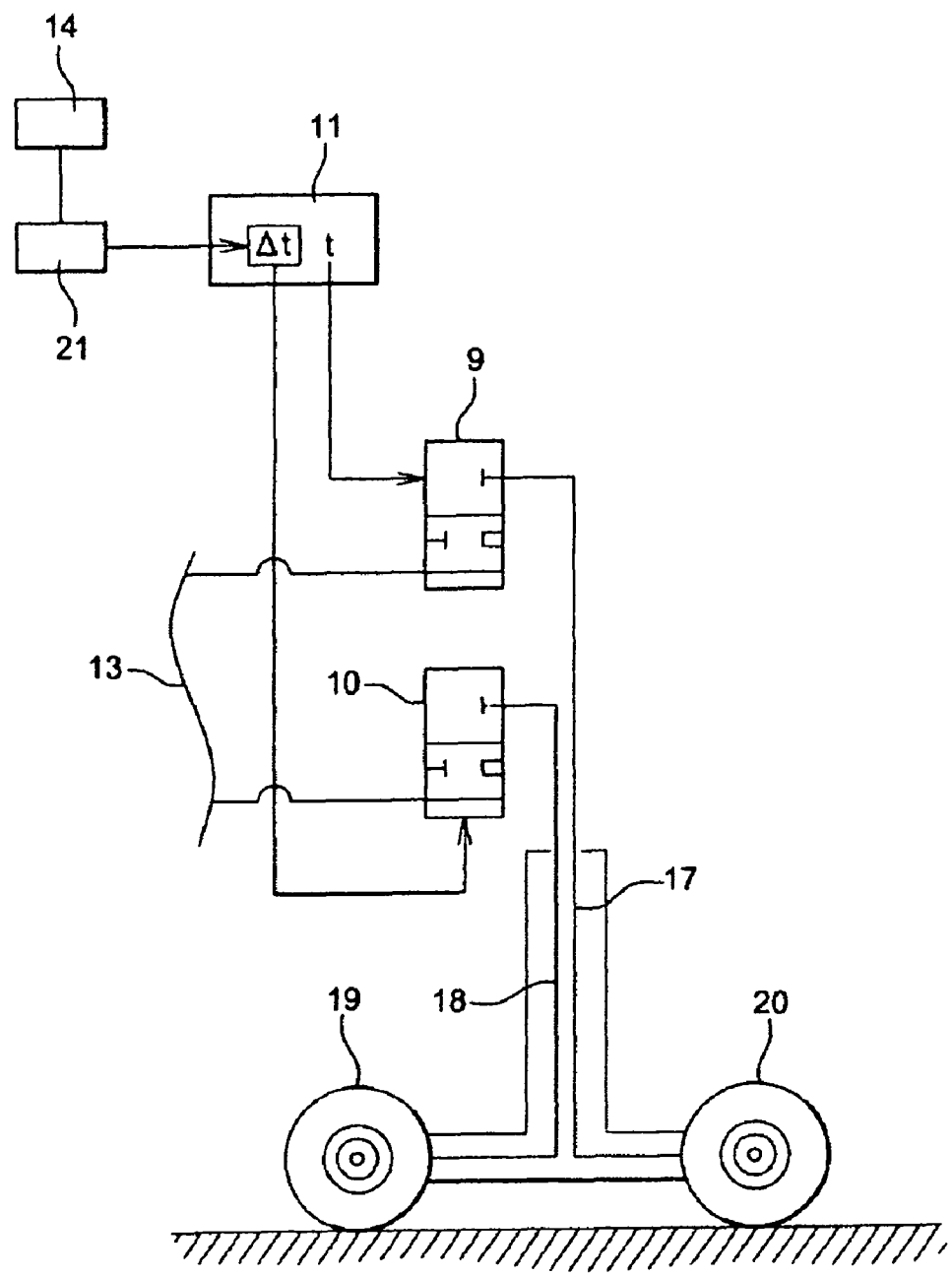
FIG. 3 is a schematic representation of an example of a functional diagram of the braking-energy equalization system incorporated into a brake circuit for an aircraft's landing gear.

FIG. 3 shows an example of a functional diagram of the braking-energy equalization system incorporated into a brake circuit for a set of aircraft landing gear that includes at least two in-line wheels. Each wheel is equipped with a brake that is actuated by means of an actuator in order to control the opening or closing of a valve [9, 10] located between a hydraulic [fluid] distributor [13] and a hydraulic brake line [17, 18] feeding respectively the brakes of the wheels [20, 19]. The actuators intended to control the opening or closing of the valves are connected, by means of a delay mechanism [11] that is part of the braking-energy equalization system, to brake controls [14] located in the cockpit.

The delay mechanism [11] that introduces an actuation delay between the actuators is advantageously associated with the calculator [21] that calculates automatically the delay required in order to distribute the braking energy uniformly between the wheels.

The actuators used to open and close the valve are preferably electrically controlled actuators.

In the functional diagram illustrated in FIG. 3, when the equalization system is activated, the delay mechanism [11] introduces a delay [Δt] between the opening of the valve [10] of the hydraulic [brake] line [18] that feeds the brake of the wheel [19] and the opening of the valve [9] of the hydraulic [brake] line [17] that feeds the [brake of the] second wheel [20], thereby producing a braking delay on the wheel [19].

The disclosed embodiments are not limited to the examples represented, and, in particular, delay mechanisms between the in-line wheels of a single given bogey may be combined with a delay mechanism between different sets of landing gear.

The invention claimed is:

1. A braking-energy equalization system applied to an aircraft undercarriage, which undercarriage includes at least one front wheel and at least one rear wheel, each of said at least front and rear wheels being equipped with a brake, wherein the braking energy equalization system includes means for delaying an activation of the braking of the wheel the brake of which having a higher braking torque capability so as to occur after an activation of the braking of the other wheel, the delay being determined by the braking energy equalization system to equalize the braking energies absorbed by the brake having a higher braking torque capability and the brake of the other wheel during a braking phase of the aircraft.

2. A braking-energy equalization system according to claim 1, wherein the at least one front wheel and at least one rear wheel are two wheels in-line of a single set of landing gear.

3. A braking-energy equalization system according to claim 1, wherein the at least one front wheel and at least one rear wheel are wheels of different sets of landing gear.

4. A braking-energy equalization system according to claim 1, wherein a duration of the delay is between 0.5 second and 1.5 seconds.

5. A braking-energy equalization system according to claim 1, wherein the means include a calculator that makes it possible to calculate the delay as a function of a mass of the aircraft and a center of gravity of the aircraft, and of a flight phase of the aircraft.

6. An aircraft equipped with a braking-energy equalization system, which aircraft having an undercarriage including at least two sets of landing gear, each set of landing gear including at least two wheels, and each of the at least two wheels of the at least two sets of landing gear being equipped with a brake that is actuated by means of an actuator in order to control an opening or closing of a valve located between a hydraulic fluid distributor and a hydraulic brake line feeding the brake, which actuator is activated remotely by brake controls located in the cockpit, wherein the actuator for each brake is connected to the brake controls by means of a delay mechanism that is part of the braking-energy equalization system, which introduces a predetermined delay in activating braking of at least one set of landing gear having a higher braking torque after activating braking of the other set, and a predetermined delay in activating braking of one wheel after activating braking of the other wheel of at least one of the at least two sets of landing gear.

7. An aircraft according to claim 6, wherein the actuator for each brake is an electrically controlled actuator that controls the opening or closing of the valve located between the brake line and the hydraulic fluid distributor.

8. A method for equalizing the braking-energy between at least one front wheel and at least one rear wheel of an aircraft undercarriage, each of said front and rear wheels equipped with a brake, the method comprising:
   delaying an activation of the brake of the at least one front wheel or the at least one rear wheel which has a higher braking torque capability so as to occur after an activation of the brake of another of the at least one front wheel or the at least one rear wheel; and
   determining the delay to equalize the braking energies absorbed by the brake of the at least one front wheel and the brake of the at least one rear wheel during a braking phase of the aircraft.

\* \* \* \* \*